United States Patent
Lal et al.

(10) Patent No.: US 10,181,946 B2
(45) Date of Patent: Jan. 15, 2019

(54) CRYPTOGRAPHIC PROTECTION OF I/O DATA FOR DMA CAPABLE I/O CONTROLLERS

(71) Applicant: Intel Corporation, Santa Clara, CA (US)

(72) Inventors: Reshma Lal, Hillsboro, OR (US); Steven B. McGowan, Portland, OR (US); Siddhartha Chhabra, Hillsboro, OR (US); Gideon Gerzon, Zichron Yaakov (IL); Bin Xing, Hillsboro, OR (US); Pradeep M. Pappachan, Hillsboro, OR (US); Reouven Elbaz, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 149 days.

(21) Appl. No.: 14/974,956

(22) Filed: Dec. 18, 2015

(65) Prior Publication Data
US 2017/0026171 A1    Jan. 26, 2017

Related U.S. Application Data

(60) Provisional application No. 62/194,763, filed on Jul. 20, 2015, provisional application No. 62/195,148, filed on Jul. 21, 2015.

(51) Int. Cl.
*H04L 9/06* (2006.01)
*G06F 13/28* (2006.01)
(Continued)

(52) U.S. Cl.
CPC ............ *H04L 9/0631* (2013.01); *G06F 13/28* (2013.01); *H04L 9/0618* (2013.01); *H04L 9/0822* (2013.01); *H04L 9/3242* (2013.01)

(58) Field of Classification Search
CPC ........................................................ G06F 13/28
(Continued)

(56) References Cited

U.S. PATENT DOCUMENTS

| 7,685,436 | B2 * | 3/2010 | Davis | G06F 21/72 713/153 |
| 7,716,389 | B1 * | 5/2010 | Bruce | G06F 13/28 370/338 |

(Continued)

OTHER PUBLICATIONS

International search report for PCT application No. PCT/US2016/038389, dated Sep. 26, 2016 (3 pages).
(Continued)

*Primary Examiner* — Khalil Naghdali
(74) *Attorney, Agent, or Firm* — Barnes & Thornburg LLP

(57) ABSTRACT

Technologies for cryptographic protection of I/O data include a computing device with one or more I/O controllers. Each I/O controller may generate a direct memory access (DMA) transaction that includes a channel identifier that is indicative of the I/O controller and that is indicative of an I/O device coupled to the I/O controller. The computing device intercepts the DMA transaction and determines whether to protect the DMA transaction as a function of the channel identifier. If so, the computing device performs a cryptographic operation using an encryption key associated with the channel identifier. The computing device may include a cryptographic engine that intercepts the DMA transaction and determines whether to protect the DMA transaction by determining whether the channel identifier matches an entry in a channel identifier table of the cryptographic engine. Other embodiments are described and claimed.

20 Claims, 7 Drawing Sheets

(51) Int. Cl.
*H04L 9/08* (2006.01)
*H04L 9/32* (2006.01)

(58) Field of Classification Search
USPC .......................................................... 380/44
See application file for complete search history.

(56) References Cited

U.S. PATENT DOCUMENTS

| | | | | |
|---|---|---|---|---|
| 7,865,631 B2* | 1/2011 | Madruga | ................ | G06F 13/28 |
| | | | | 710/22 |
| 7,937,595 B1* | 5/2011 | Kumar | .................... | G06F 21/10 |
| | | | | 345/519 |
| 2007/0294496 A1* | 12/2007 | Goss | ................... | G06F 12/1408 |
| | | | | 711/163 |
| 2007/0294745 A1* | 12/2007 | Tan | ........................ | G06F 21/74 |
| | | | | 726/2 |
| 2010/0169636 A1* | 7/2010 | Davis | .................... | G06F 21/72 |
| | | | | 713/2 |
| 2013/0042043 A1* | 2/2013 | Zhang | ................... | G06F 13/28 |
| | | | | 710/308 |
| 2014/0188732 A1* | 7/2014 | Kobres | .............. | H04L 63/0442 |
| | | | | 705/64 |

OTHER PUBLICATIONS

Written opinion for PCT application No. PCT/US2016/038389, dated Sep. 26, 2016 (9 pages).

* cited by examiner

CRYPTOGRAPHIC PROTECTION OF I/O DATA FOR DMA CAPABLE I/O CONTROLLERS

CROSS-REFERENCE TO RELATED APPLICATIONS

The present application claims priority under 35 U.S.C. § 119(e) to U.S. Provisional Patent Application Ser. No. 62/194,763, entitled "CRYPTOGRAPHIC PROTECTION OF I/O DATA FOR DMA CAPABLE I/O CONTROLLERS," which was filed on Jul. 20, 2015, and to U.S. Provisional Patent Application Ser. No. 62/195,148, entitled "CRYPTOGRAPHIC PROTECTION OF I/O DATA FOR DMA CAPABLE I/O CONTROLLERS," which was filed on Jul. 21, 2015.

BACKGROUND

Typical computing devices may rely on software agents, such as anti-malware agents, for security. However, it is difficult to keep up with the increasing number of malware attacks on users' devices. To combat the malware threat, there is a trend to protect security-sensitive software by running it inside a Trusted Execution Environment (TEE). TEEs provide a sterile environment that can protect secrets even when other parts of the system are compromised. Examples of TEEs include Intel® Software Guard Extensions (Intel® SGX), secure virtual machines (VMs), and a converged security engine (CSE). The TEE, while useful to protect secrets within the TEE, may not protect I/O data such as user and sensor data that is communicated into and/or out of the secure "container." The security requirements for trusted I/O vary per use case and device, and may involve flavors and combinations of confidentiality, integrity, liveliness, and replay protection.

On a personal computer platform, securing I/O has several complexities. To protect I/O for a given usage, many input devices may need to be secured because the platform often has multiple devices of the same category connected via different I/O controllers, and a user may dynamically select any one of the connected devices during use. For example, when inputting text, the user may choose to use an embedded keyboard, a USB keyboard, or a Bluetooth (BT) keyboard. The user may also use a touch screen to input data. This means all keyboards and touch input may need to be secured for a usage that requires secure text input. Additionally, I/O devices may be used by secure applications and by regular applications, which means that those devices may be required to switch dynamically from being protected to being in-the-clear and vice versa.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
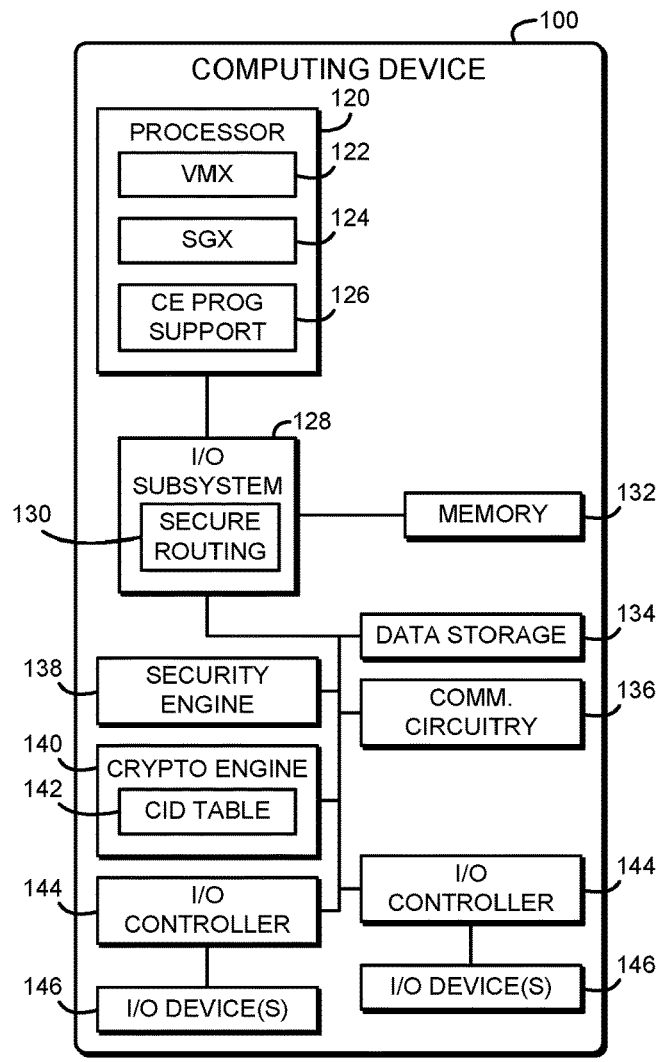
FIG. 1 is a simplified block diagram of at least one embodiment of a computing device for cryptographic protection of I/O data.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a computing device 100 for secure I/O includes, among other components, a processor 120, main memory 132, a cryptographic engine 140, and one or more I/O controllers 144 in communication with one or more I/O devices 146. In use, as further described below, the cryptographic engine 140 provides on-the-fly encryption and decryption of data transferred via direct memory access operations (DMAed) between the platform I/O controllers 144 and the memory 132. Each DMA transaction is tagged with a channel ID (CID) representing a flow of data associated with a particular I/O device 146 or set of I/O devices 146. The cryptographic engine 140 uses the CID to reliably identify transactions that must be protected, retrieve the corresponding encryption keys, and perform appropriate cryptographic operations on the DMA data. The cryptographic engine 140 may allow unprotected transactions to pass through unchanged, without performing cryptographic operations. The cryptographic engine 140 is programmed with channel information and associated encryption keys by trusted software. Thus, the cryptographic engine 140 provides confidentiality, integrity, anti-replay protection, and authentication.

As further described below, the computing device 100 uses the cryptographic engine 140 to protect I/O for DMA capable devices 146 in a way that may simplify the software model, can support high bandwidth I/O data (matching throughput of the I/O controller 144 with low latency), is scalable, and may provide a higher level of security through hardware based protection. Additionally, the use of a CID to identify secure DMA transactions may minimize the impact on existing controllers 144 to support trusted I/O, and may not require any changes to the individual devices 146 connected to the I/O controllers 144. Further, because the computing device 100 protects the data payload and not the data path, existing untrusted software components (e.g., platform firmware, operating systems, VMMS, bus drivers, and other low-level hardware drivers) may be used without requiring those components to be included in the platform's trusted code base (TCB). Additionally, the use of CIDs to protect DMA channels allows protection of data at device-level granularity and also may allow hardware-based attestation regarding data origin authenticity (i.e., that data came from a specific device 146 on the local platform).

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 128, a memory 132, a data storage device 134, and communication circuitry 136. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 132, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. As shown, the processor 120 may include hardware virtualization support 122, secure enclave support 124, and crypto engine programming support 126.

The hardware virtualization support 122 supports virtualized execution of operating systems, applications, and other software by the computing device 100. The hardware virtualization support 122 may include virtual machine extensions (VMX) support by providing two modes of execution: VMX-root mode and VMX non-root mode. The VMX-root mode allows executing software to have broad control of the computing device 100 and its hardware resources. Conversely, a hypervisor, virtual machine monitor (VMM), or host operating system (OS) may execute in VMX-root mode. The VMX non-root mode restricts access to certain hardware instructions while still implementing the ordinary ring/privilege system of the processor 120. One or more guest OSs may execute in the VMX non-root mode. Those guest OSs may execute in ring zero, similar to being executed without virtualization. The hardware virtualization support 122 may also support extended page tables (EPT), which may be embodied as hardware-assisted second-level page address translation. The hardware virtualization support 122 may be embodied as, for example, Intel® VT-x technology.

The secure enclave support 124 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 132. The secure enclave support 124 may be embodied as a set of processor instruction extensions that allows the processor 120 to establish one or more secure enclaves in the memory 132. For example, the secure enclave support 124 may be embodied as Intel® Software Guard Extensions (SGX) technology.

The crypto engine programming support 126 allows the processor 120 to program the cryptographic engine 140 to provide cryptographic protection of DMA I/O data. In particular, the processor 120 may enable or disable encryption for certain DMA I/O channels, and may securely provide encryption keys to the cryptographic engine 140. The crypto engine programming support 126 may be embodied as one or more specialized processor instructions and associated hardware, microcode, firmware, or other components of the processor 120. The crypto engine programming support 126 of the processor 120 may allow trusted software to program the cryptographic engine 140 while preventing untrusted software from programming the cryptographic engine 140.

The memory 132 may be embodied as any type of volatile or non-volatile memory or data storage capable of performing the functions described herein. In operation, the memory 132 may store various data and software used during operation of the computing device 100 such as operating systems, applications, programs, libraries, and drivers. The memory 132 is communicatively coupled to the processor 120 via the I/O subsystem 128, which may be embodied as circuitry and/or components to facilitate input/output operations with the processor 120, the memory 132, and other components of the computing device 100. For example, the I/O subsystem 128 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. Additionally or alternatively, in some embodiment the memory 132 may be communicatively coupled to the processor 120 via an integrated memory controller of the processor 120. The I/O subsystem 128 may further include secure routing support 130. The secure routing support 130 includes hardware support to ensure I/O data cannot be misrouted in the fabric 128 under the influence of rogue software. The secure routing support 130 may be used with the cryptographic engine 140 to provide cryptographic protection of I/O data. In some embodiments, the I/O subsystem 128 may form a portion of a system-on-a-chip (SoC) and be incorporated, along with the processor 120, the memory 132, and other components of the computing device 100, on a single integrated circuit chip.

The data storage device 134 may be embodied as any type of device or devices configured for short-term or long-term storage of data such as, for example, memory devices and circuits, memory cards, hard disk drives, solid-state drives, or other data storage devices. In some embodiments, the data storage device 134 may be used to store the contents of one or more secure enclaves. When stored by the data storage device 134, the contents of the secure enclave may be encrypted to prevent unauthorized access.

The communication circuitry 136 of the computing device 100 may be embodied as any communication circuit, device, or collection thereof, capable of enabling communications between the computing device 100 and other remote devices over a network. The communication circuitry 136 may be configured to use any one or more communication technology (e.g., wired or wireless communications) and associated protocols (e.g., Ethernet, Bluetooth®, Wi-Fi®, WiMAX, etc.) to effect such communication.

In some embodiments, the computing device 100 may include a security engine 138, which may be embodied as any hardware component(s) or circuitry capable of providing security-related services to the computing device 100. In particular, the security engine 138 may include a microprocessor, microcontroller, or other embedded controller capable of executing firmware and/or other code independently and securely from the processor 120. Thus, the security engine 138 may be used to establish a trusted execution environment separate from code executed by the processor 120. The security engine 138 may communicate with the processor 120 and/or other components of the computing device 100 over a dedicated bus, such as a host embedded controller interface (HECI). The security engine 138 may also provide remote configuration, control, or management of the computing device 100. In the illustrative embodiment, the security engine 138 is embodied as a converged security and manageability engine (CSME) incorporated in a system-on-a-chip (SoC) of the computing device 100. In some embodiments, the security engine 138 may be embodied as a manageability engine, an out-of-band processor, a Trusted Platform Module (TPM), or other security engine device or collection of devices. Further, in some embodiments, the security engine 138 is also capable of communicating using the communication circuitry 136 or a dedicated communication circuit independently of the state of the computing device 100 (e.g., independently of the state of the main processor 120), also known as "out-of-band" communication.

The cryptographic engine 140 may be embodied as any microcontroller, microprocessor, functional block, logic, or other circuit or collection of circuits capable of performing the functions described herein. As further described below, the cryptographic engine 140 may encrypt and/or decrypt I/O data read or written by the I/O controllers 144 in one or more direct memory access (DMA) operations to the memory 132. The cryptographic engine 140 includes an internal channel identifier (CID) table 142, which the cryptographic engine 140 uses to dynamically identify DMA channel(s) to be protected. The CID table 142 may be controlled and/or programmed by trusted software, for example using the crypto engine programming support 126 of the processor 120. The encryption keys and/or other secret information of the CID table 142 are not available to untrusted software. In some embodiments, the cryptographic engine 140 may be incorporated along with the I/O subsystem 128 and/or the processor 120 in a system-on-a-chip (SoC) of the computing device 100. Additionally, although illustrated as a hardware cryptographic engine, it should be understood that in some embodiments the cryptographic engine 140 may be embodied as any secure computational component of the computing device 100, including any combination of hardware, firmware, processor microcode, and/or software of the computing device 100.

Similarly, the I/O controllers 144 may be embodied as any embedded controller, microcontroller, microprocessor, functional block, logic, or other circuit or collection of circuits capable of performing the functions described herein. In some embodiments, one or more of the I/O controllers 144 may be embedded in another component of the computing device 100 such as the I/O subsystem 128 and/or the processor 120. Additionally or alternatively, one or more of the I/O controllers 144 may be connected to the I/O subsystem 128 and/or the processor 120 via an expansion bus such as PCI Express (PCIe) or other I/O connection. As further described below, the I/O controllers 144 communicate with one or more I/O devices 146, for example over a peripheral communications bus (e.g., USB, Bluetooth, etc.). The I/O devices 146 may be embodied as any I/O device, such as human interface devices, keyboards, mice, touch screens, microphones, cameras, and other input devices, as well as displays and other output devices. As described above, the I/O controllers 144 and associated DMA channels are uniquely identified using identifiers called channel identifiers (CIDs). Each I/O controller 144 may assert an appropriate CID with every DMA transaction, for example as part of a transaction layer packet (TLP) prefix, to uniquely identify the source of the DMA transaction and provide liveness protections. The CID also enables the isolation of I/O from different devices 146.

Figure 2:
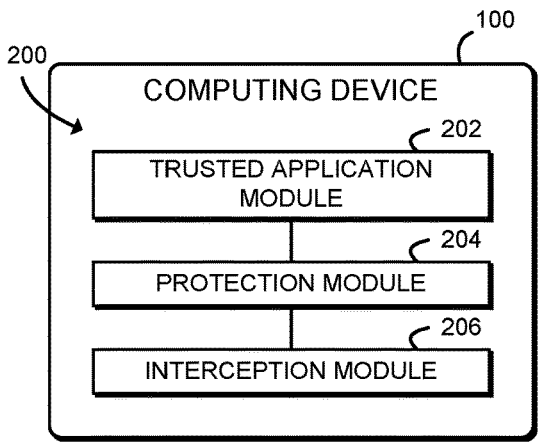
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a trusted application module 202, a protection module 204, and an interception module 206. The various modules of the environment 200 may be embodied as hardware, firmware, microcode, software, or a combination thereof. As such, in some embodiments, one or more of the modules of the environment 200 may be embodied as circuitry or collection of electrical devices (e.g., trusted application circuitry 202, protection circuitry 204, and/or interception circuitry 206). It should be appreciated that, in such embodiments, one or more of the trusted application circuitry 202, the protection circuitry 204, and/or the interception circuitry 206 may form a portion of one or more of the processor 120, the I/O subsystem 126, the cryptographic engine 140, and/or other components of the computing device 100. Additionally, in some embodiments, one or more of the illustrative modules may form a portion of another module and/or one or more of the illustrative modules may be independent of one another.

The interception module 206 is configured to intercept direct memory access (DMA) transactions generated by the I/O controllers 144. Each I/O controller 144 may generate one or more DMA transactions, and each DMA transaction includes a channel identifier that identifies the associated I/O controller 144 and I/O device 146. The interception module 206 is further configured to determine whether to protect the DMA transaction as a function of the channel identifier. The interception module 206 may be configured to pass the DMA transaction to the memory 132 in response to determining not to protect the DMA transaction.

The protection module 204 is configured to perform a cryptographic operation using an encryption key associated with the channel identifier in response to determining to protect the DMA transaction. The cryptographic operation performed may depend on whether the intercepted DMA transaction is a write transaction, a read request transaction, or a read completion transaction. For example, for a write transaction including plaintext I/O data, the protection module 204 may be configured to generate encrypted cipher text as a function of the plaintext I/O data and the encryption key. For a write transaction, the protection module 204 may be further configured to generate a DMA write transaction in response to performance of the cryptographic operation, which includes an authentication tag structure and an address of an authentication tag buffer in the memory 132.

For a read request transaction, the protection module 204 may be configured to generate a DMA read request transaction, which includes a data tag and a target address in the memory 132 from the original DMA transaction. The protection module 204 may be further configured to generate another DMA read request transaction, which includes an authentication tag (AT) tag and an address of an authentication tag buffer in the memory 132. For the read request transaction, the interception module 206 may be further configured to intercept a DMA read completion transaction in response to generation of the DMA read request transaction. The DMA read completion transaction may include the data tag and encrypted cipher text or the AT tag and an authentication tag structure. For an intercepted read completion transaction, the protection module 204 may be configured to generate a DMA read completion transaction, which includes plaintext I/O data, a controller tag from the DMA read request transaction, and the channel identifier.

The trusted application module 202 is configured to decrypt, by trusted software, the cipher text stored in the memory 132 with the encryption key in response generation of a DMA write transaction. The trusted application module 202 may be configured to establish an application secure enclave using the secure enclave support 124 of the processor 120. The application secure enclave may include or otherwise protect the trusted software. Although the illustrative embodiment protects the trusted software with the secure enclave support 124 of the processor 120, it should be understood that the technologies of this disclosure may deliver trusted input to any trusted execution environment (TEE), including an Intel® SGX secure enclave, a secure virtual machine (VM), or other TEE.

Figure 3:
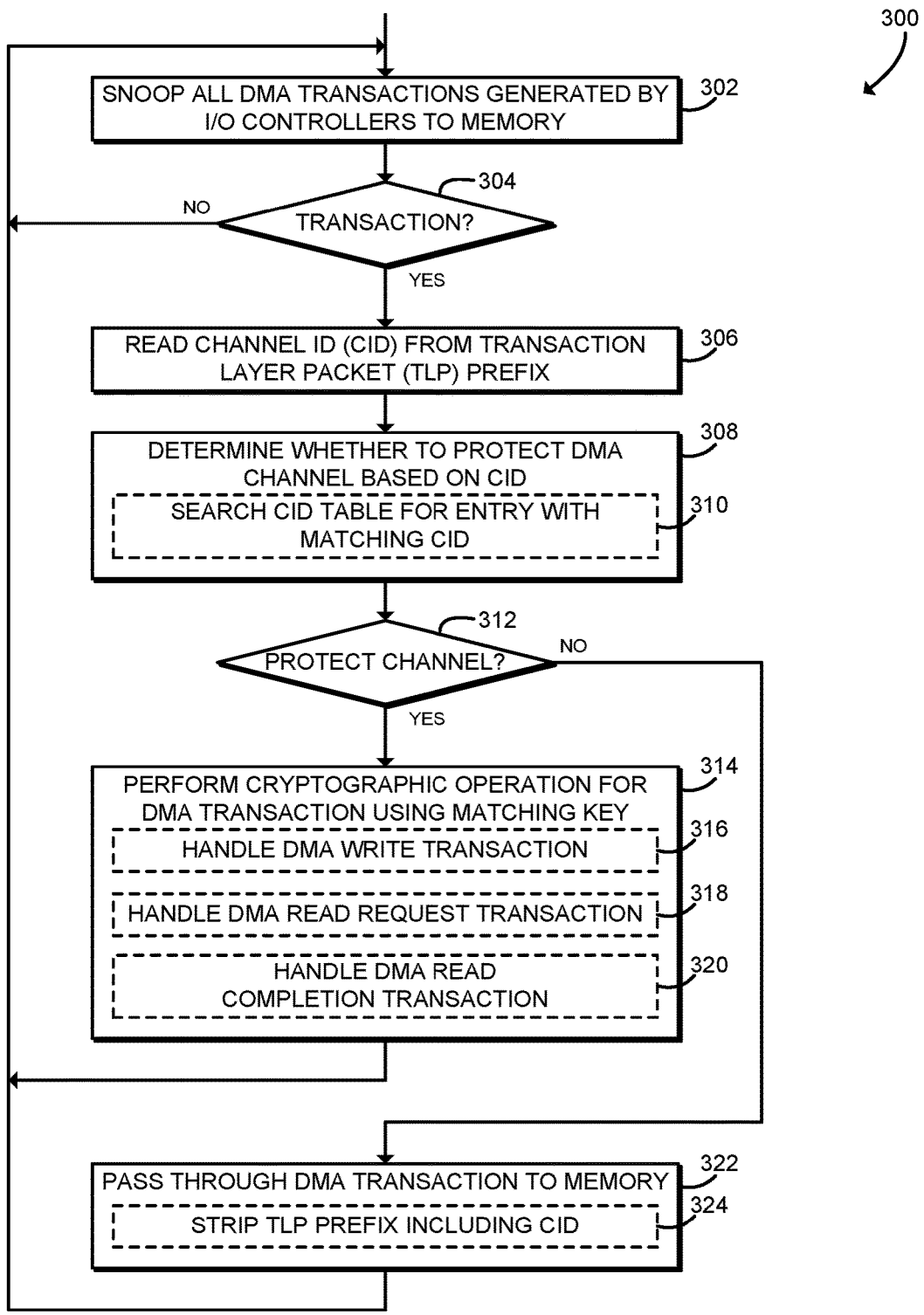
FIG. 3 is a simplified flow diagram of at least one embodiment of a method for cryptographic protection of I/O data that may be executed by a cryptographic engine of the computing device of FIGS. 1-2.

Referring now to FIG. 3, in use, the computing device 100 may execute a method 300 for cryptographically secure I/O with direct memory access (DMA) controllers. The method 300 may be executed by hardware, firmware, software, or other execution resources of the cryptographic engine 140. The method 300 begins with block 302, in which the cryptographic engine 140 snoops all direct memory access (DMA) transactions generated by the I/O controllers 144 to the memory 132. The cryptographic engine 140 may intercept each DMA transaction generated by the I/O controllers 144 prior to that DMA transaction reaching the memory 132. Each DMA transaction may be embodied as a command generated by an I/O controller 144 to write data to the memory 132 (an input transaction) or to read data from the memory 132 (an output transaction). In particular, the I/O controllers 144 may act as bus masters and generate PCI Express (PCIe) Transaction Layer Packets (TLPs) to read or write data from/to memory 132. Thus, each DMA transaction may be embodied as a PCIe DMA transaction such as a write transaction, a read request transaction, or a read completion transaction. In block 304, the cryptographic engine 140 determines whether a transaction has been detected. If not, the method 300 loops back to block 302 to continue monitoring for DMA transactions. If a DMA transaction was detected, the method 300 advances to block 306.

In block 306, the cryptographic engine 140 reads a channel identifier (CID) from a transactional layer packet (TLP) prefix of the DMA transaction. The CID uniquely identifies a particular DMA channel on the computing device 100, which represents a flow of data associated with a particular I/O device 146 or set of I/O devices 146. In particular, the CID may include a controller identifier that identifies a particular I/O controller 144 and a channel number, which identifies the particular I/O device 146 connected to the I/O controller 144. In some embodiments, each I/O controller 144 may include a CID in every DMA transaction that is generated, regardless of whether the associated DMA channel is secure. The values assigned to and the size of the respective fields of the CID may be dependent on the computing device 100 and/or the controller 144.

Figure 4:
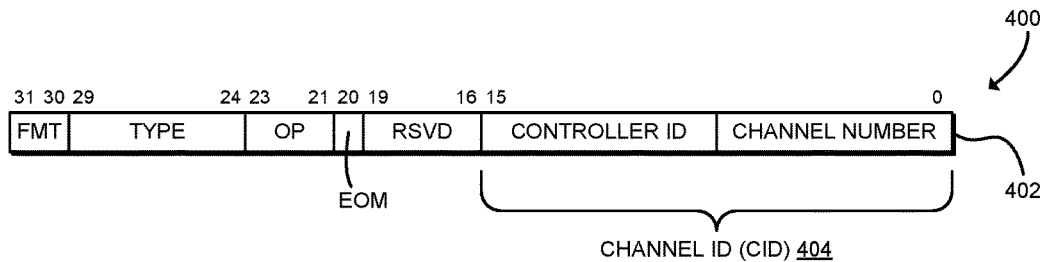
FIG. 4 is a schematic diagram illustrating at least one embodiment of a transaction layer packet prefix that may be processed by the computing device of FIGS. 1-2.

Referring now to FIG. 4, diagram 400 illustrates one potential embodiment of a TLP prefix 402 including a channel identifier 404. The diagram 400 illustrates a channel ID (CID) format that may be used on PCIe compatible computing devices 100. As described above, in order to DMA data on PCIe compatible systems, the I/O controllers 144 act as bus masters, generating PCIe transaction layer packets (TLPs) to read or write data from/to memory 132. A TLP consists of a 4 DWORD Header, followed by (on Intel® IA platforms) up to 256 bytes of data. Optionally, up to four 32-bit TLP prefixes may be prepended to a TLP. As shown, the computing device 100 may use one of the TLP prefixes to carry the CID information for the DMA transaction. In particular, the diagram 400 shows vendor-defined TLP prefix 402 that may be included with each TLP. The TLP prefix 402 includes a channel identifier field 404, which uniquely identifies the I/O controller 144 and the DMA channel of the device 146 associated with the transaction, respectively. The illustrative TLP prefix 402 also includes other flags which may allow the cryptographic engine 140 to identify and manage its encryption/decryption of the respective transaction.

Referring back to FIG. 3, after reading the CID from the DMA transaction, in block 308 the cryptographic engine 140 determines whether to protect the DMA transaction based on the CID. Each DMA channel of the computing device 100 may be individually programmed to secure operation and out of secure operation using the crypto engine programming support 126 of the processor 120, as described above. Thus, the cryptographic engine 140 may use any appropriate technique to determine whether the DMA channel associated with the CID has been programmed to secure. In some embodiments, in block 310 the cryptographic engine 140 may search the CID table 142 for an entry that matches the CID read from the DMA transaction. As described above, the CID table 142 may be embodied as a content-addressable memory (CAM) or other data structure that may be indexed with the CID to retrieve a matching entry. The CID table 142 may include an entry matching the CID if the cryptographic engine 140 has been programmed to secure the associated DMA channel. The CID table 142 may not include a matching entry if the associated DMA channel has not been programmed for secure operation. Additionally or alternatively, in some embodiments the matching entry in the CID table 142 may indicate whether the associated DMA channel has been programmed for secure operation. In block 312, the cryptographic engine 140 determines whether to protect the DMA channel associated with the CID. If not, the method 300 branches ahead to block 322, described below. If the cryptographic engine 140 determines to protect the DMA channel, the method 300 advances to block 314.

In block 314, the cryptographic engine 140 performs a cryptographic operation associated with the DMA transaction using an encryption key associated with the matching CID. For example, the cryptographic engine 140 may retrieve the encryption key from a matching entry in the CID table 142 and perform the cryptographic operation. The cryptographic engine 140 may use information stored in the CID table 142 entry, such as encryption keys, counter values, and other information, to perform the cryptographic operation. In particular, the cryptographic engine 140 may encrypt data input from the I/O device 146 prior to that data being written to the memory 132, the cryptographic engine 140 may decrypt data read from the memory 132 prior to that data being output to the I/O device 146, and the cryptographic engine 140 may perform cryptographic authentication of data. In some embodiments, the encryption operation may be performed as a result of processing more than one DMA transaction (e.g., by processing a read request and associated read completion).

Thus, in some embodiments, in block 316 the cryptographic engine 140 may handle a DMA write transaction. One embodiment of a method for handling a DMA write transaction is described below in connection with FIG. 5. In some embodiments, in block 318 the cryptographic engine 140 may handle a DMA read request transaction. One embodiment of a method for handling a DMA read request transaction is described below in connection with FIG. 7. In some embodiments, in block 320 the cryptographic engine 140 may handle a DMA read completion transaction. One embodiment of a method for handling a DMA read completion transaction is described below in connection with FIG. 9. After performing the cryptographic operation, the method 300 loops back to block 302 to continue snooping DMA transactions.

Referring back to block 312, if the cryptographic engine 140 determines not to protect the DMA channel, the method 300 branches to block 322. In block 322, the cryptographic engine 140 passes through the DMA transaction to the memory 132 without performing a cryptographic operation. After being passed through, the DMA transaction may be performed by the memory 132 as a typical transaction, without being secured or otherwise protected by the cryptographic engine 140. In some embodiments, in block 324 the cryptographic engine 140 may strip the TLP prefix including the CID from the DMA transaction. In those embodiments, the DMA transaction provided to the memory 132 may be the same as or similar to a typical unsecured DMA transaction. After passing through the DMA transaction, the method 300 loops back to block 302 to continue snooping DMA transactions.

Figure 5:
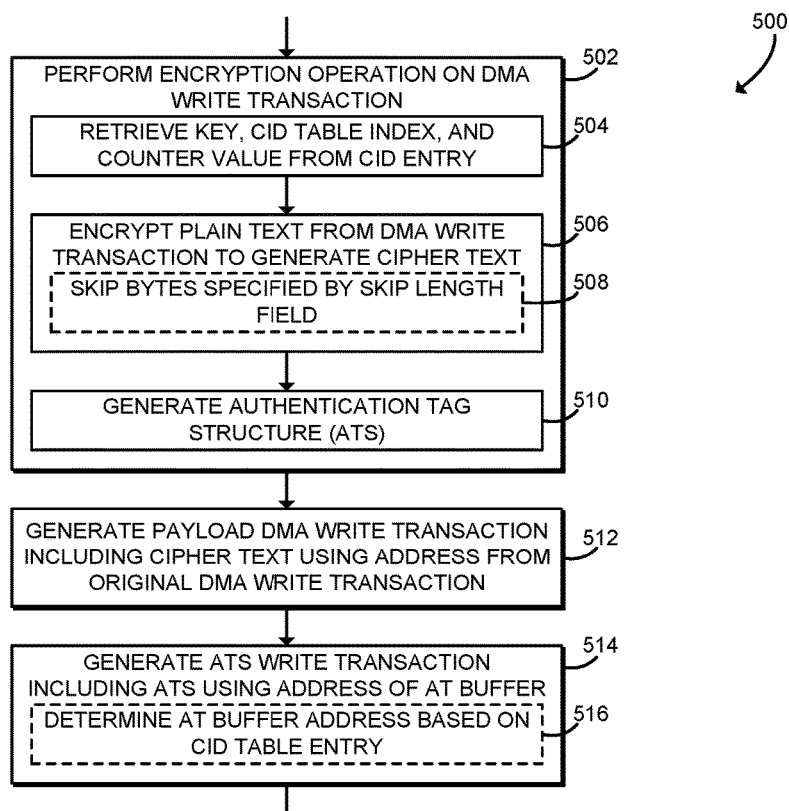
FIG. 5 is a simplified flow diagram of at least one embodiment of a method for processing a write transaction that may be executed by the cryptographic engine of the computing device of FIGS. 1-2.

Referring now to FIG. 5, in use, the computing device 100 may execute a method 500 for processing a DMA write transaction. The method 500 may be executed by the cryptographic engine 140 as part of the method 300, for example in connection with block 316 of FIG. 3. The method 500 begins with block 502, in which the cryptographic engine 140 performs an encryption operation on the DMA write transaction. As described above in connection with FIG. 3, the cryptographic engine 140 intercepts the DMA write transaction and determines that the channel identifier (CID) of the DMA transaction matches an entry in the CID table 142. The DMA write transaction also includes additional information, such as a destination address in the memory 132, plaintext I/O data generated by the I/O device 146, and other I/O data.

In block 504, the cryptographic engine 140 retrieves the encryption key, CID table 142 index, and a counter value from the matching CID entry. The CAM table 142 may include additional information related to channel protection such as protection mode, direction bit, and skipping. The protection mode determines if the data should be encrypted only, integrity protected only, or fully protected. The direction bit indicates whether protection needs to be applied to input data or output data. The skipping value indicates whether certain bytes of the plaintext I/O data should not be encrypted.

In block 506, the cryptographic engine 140 encrypts the plaintext I/O data from the DMA write transaction to generate encrypted cipher text. The cryptographic engine 140 may use any appropriate encryption algorithm. For example, in some embodiments the cryptographic engine 140 may perform AES-GCM encryption. The cryptographic engine 140 encrypts the I/O data using the encryption key retrieved from the CID table 142. In some embodiments, in block 508 the cryptographic engine 140 may skip a certain number of bytes specified by a skip length field of the matching CID table 142 entry. For example, the cryptographic engine 140 may pass through the skipped bytes without encryption. With regard to skipping, several I/O protocols include some metadata that enables lower-level drivers to route the data to the correct software stack. The cryptographic engine 140 may be programmed to skip encrypting the metadata, leaving the metadata in the clear to enable pre-existing drivers to continue to function. By leaving routing (e.g., header) information in the clear, not only may the trusted code base (TCB) of the computing device 100 be reduced, but also reuse of existing I/O software may be increased. For instance, the first byte of a human interface device (HID) device report may be used for routing by the system HID class driver. As another example, the first 9 bytes of a Bluetooth L2CAP Packet may be used for routing by the system BT L2CAP Driver.

In block 510, the cryptographic engine 140 generates an authentication tag structure (ATS) based on the DMA write transaction. The ATS provides authenticity and integrity assurances for the encrypted cipher text. The authentication tag structure may be generated by any appropriate authenticated encryption algorithm, such as AES-GCM. The cryptographic engine 140 may generate an ATS for each DMA write transaction received. Additionally or alternatively, to reduce the number of input ATSs generated, the cryptographic engine 140 may compute a single ATS across multiple DMA write transactions used for the same input operation.

In block 512, the cryptographic engine 140 generates a payload DMA write transaction. The payload DMA write transaction includes the encrypted cipher text and is directed at the destination memory address of the original DMA write transaction. The cryptographic engine 140 may provide the payload DMA write transaction to the memory 132, writing the cipher text to the memory 132. After being written to the memory 132, trusted software such as an application enclave, device driver enclave, or other trusted software entity or trusted execution environment may securely read and decrypt the cipher text from the memory 132.

In block 514, the cryptographic engine 140 generates an ATS DMA write transaction. The ATS DMA write transaction includes the ATS and is directed at the address of an authentication tag (AT) buffer stored in the memory 132. For example, the cryptographic engine 140 may maintain one or more AT queues in the memory 132 to store generated ATSs. The cryptographic engine 140 may provide the ATS DMA write transaction to the memory 132, writing the ATS to the memory 132. After being written to memory the memory, trusted software such as an application enclave, device driver enclave, or other trusted software entity or trusted execution environment may read and verify the ATS from the memory 132. In some embodiments, in block 516 the cryptographic engine 140 may determine the AT buffer address based on the matching CID table 142 entry. In other words, the AT buffer may depend on the CID of the associated DMA channel. After generating the ATS DMA write transaction, the method 500 is completed. As described above in connection with FIG. 3, the cryptographic engine 140 may continue to monitor for DMA transactions.

Figure 6:
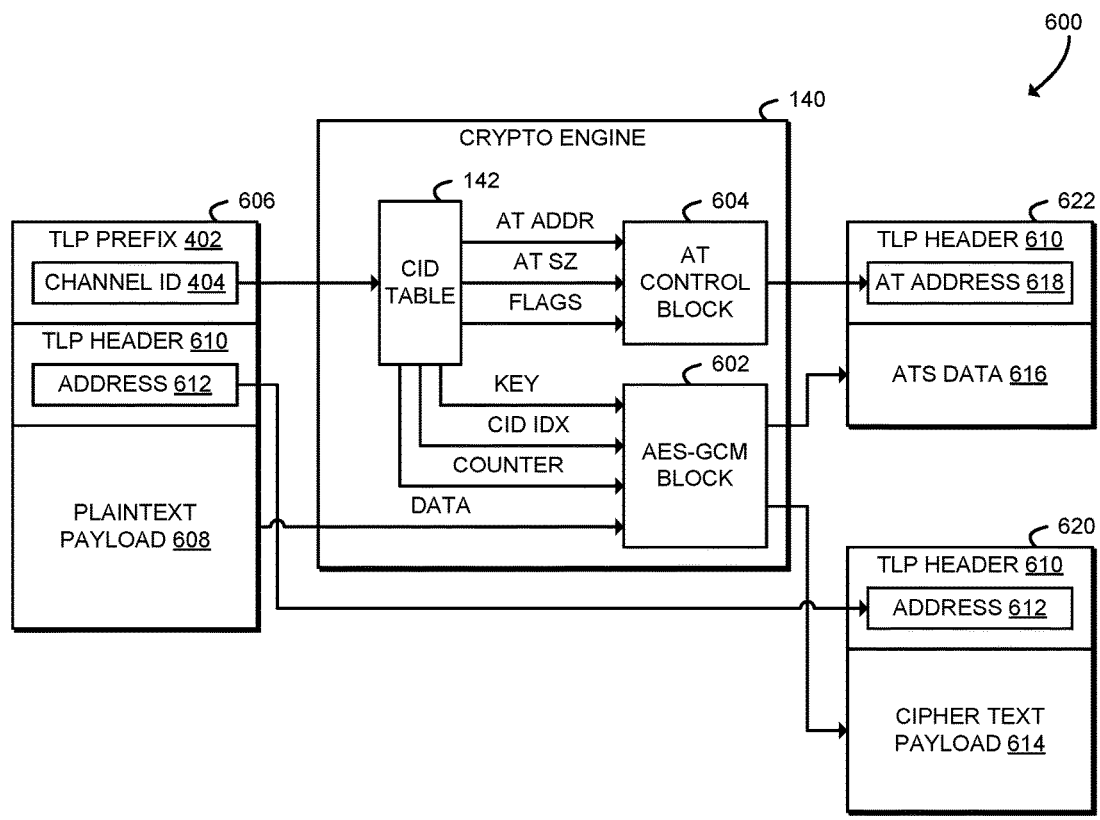
FIG. 6 is a simplified block diagram illustrating operation of the method of FIG. 5.

Referring now to FIG. 6, diagram 600 illustrates processing of a DMA write transaction that may be performed by the method 500. As shown, the cryptographic engine 140 includes the CID table 142, an AES-GCM block 602, and an authentication tag (AT) control block 604. The cryptographic engine 140 intercepts a DMA write transaction 606, which includes a plaintext payload 608, a transaction layer packet (TLP) header 610, and a TLP prefix 402. The TLP header 610 identifies a destination address 612 in the memory for the DMA write transaction. As illustrated in FIG. 4, the TLP prefix 402 includes a channel identifier (CID) 404.

The cryptographic engine 140 indexes the CID table 142 with the CID 404. An encryption key, CID index, and counter value generated by the CID table 142 and the plaintext data 608 are provided to the AES-GCM block 602. The AES-GCM block 602 generates a cipher text payload 614 and ATS data 616. An AT address, AT size, and flags are provided to the AT control block 604, which generates an AT buffer address 618. The cryptographic engine 140 generates a payload DMA write transaction 620 that includes the cipher text payload 614 and a TLP header 610 that includes the destination address 612 of the DMA write transaction 606. The cryptographic engine 140 also generates an ATS DMA write transaction 622 that includes the ATS data 616 and a TLP header 610 that includes the AT buffer address 618.

Figure 7:
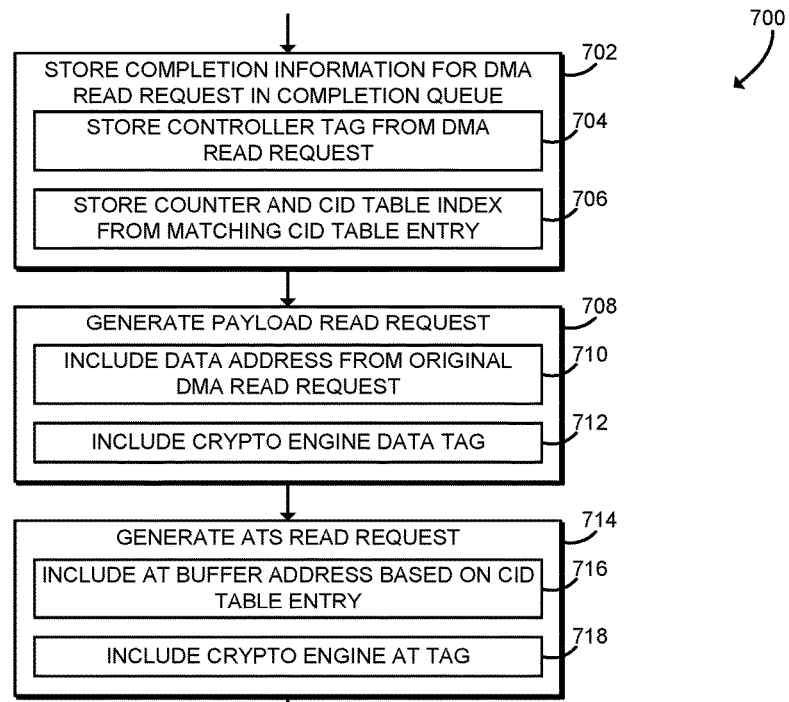
FIG. 7 is a simplified flow diagram of at least one embodiment of a method for processing a read request transaction that may be executed by the cryptographic engine of the computing device of FIGS. 1-2.

Referring now to FIG. 7, in use, the computing device 100 may execute a method 700 for processing a DMA read request transaction. The method 700 may be executed by the cryptographic engine 140 as part of the method 300, for example in connection with block 318 of FIG. 3. The method 700 begins with block 702, in which the cryptographic engine 140 stores completion information for a DMA read request in a completion queue of the cryptographic engine 140. As described above in connection with FIG. 3, the cryptographic engine 140 intercepts the DMA read request transaction and determines that the channel identifier (CID) of the DMA transaction matches an entry in the CID table 142. The DMA read request transaction also includes additional information, such as a source address in the memory 132, a controller tag associated with the I/O controller 144, and other I/O data. The cryptographic engine 140 may store information from the DMA read request transaction that will be used to process an associated DMA read completion transaction. In block 704, the cryptographic engine 140 stores the controller tag from the DMA read request transaction in the completion queue. The controller tag may include a requester ID associated with the I/O controller 144 as well as additional tag data. In block 706, the cryptographic engine 140 stores a counter value and CID table 142 index from the matching CID tables 142 entry in the completion queue.

In block 708, the cryptographic engine 140 generates a payload DMA read request. The payload DMA read request requests data stored at the source address of the original DMA read request transaction. The cryptographic engine 140 may provide the payload DMA read request transaction to the memory 132. As described further below, the memory 132 may generate a read response transaction that includes encrypted cipher text read from the source address. In block 710, the cryptographic engine 140 includes the source address of the data payload from the original DMA read request transaction in the payload DMA read request. In block 712, the cryptographic engine 140 includes a crypto engine data tag in the payload DMA read request. The data tag is associated with the cryptographic engine 140 and may be used by the cryptographic engine 140 to identify an associated read completion transaction. For example, the data tag may include a requester ID associated with the cryptographic engine 140 as well as additional tag data. The memory 132 may include the data tag in a read completion, allowing the read completion to be routed to the cryptographic engine 140. Additionally, the completion queue may be indexed with the data tag to retrieve the associated completion information.

In block 714, the cryptographic engine 140 generates an authentication tag structure (ATS) DMA read request. The ATS DMA read request requests an ATS stored in an ATS buffer in the memory 132. The address of the ATS buffer may be determined based on the CID of the associated DMA channel. In block 716, the cryptographic engine 140 includes the ATS buffer address in the ATS DMA read request. Illustratively, the ATS buffer is based on the matching CID table 142 entry; for example, the buffer address or an associated address (e.g., the address of an AT queue) may be included in the CID table 142 entry. In block 718, the cryptographic engine 140 includes a crypto engine AT tag in the ATS DMA read request. The AT tag is associated with the cryptographic engine 140 and may be used by the cryptographic engine 140 to identify an associated read completion tag. For example, the AT tag may include the requester ID associated with the cryptographic engine 140 as well as additional tag data. The memory 132 may include the AT tag in a read completion, allowing the read completion to be routed to the cryptographic engine 140. Additionally, the completion queue may be indexed with the AT tag to retrieve the associated completion information. The AT tag and the data tag, described above, may be different to allow the cryptographic engine 140 to distinguish associated read completion transactions.

After generating the payload DMA read request and the ATS DMA read request, the method 700 is completed. The memory 132 may process the read requests and generate corresponding read completions including data read from the memory 132. As described above in connection with FIG. 3, the cryptographic engine 140 may continue to monitor for DMA transactions.

Figure 8:
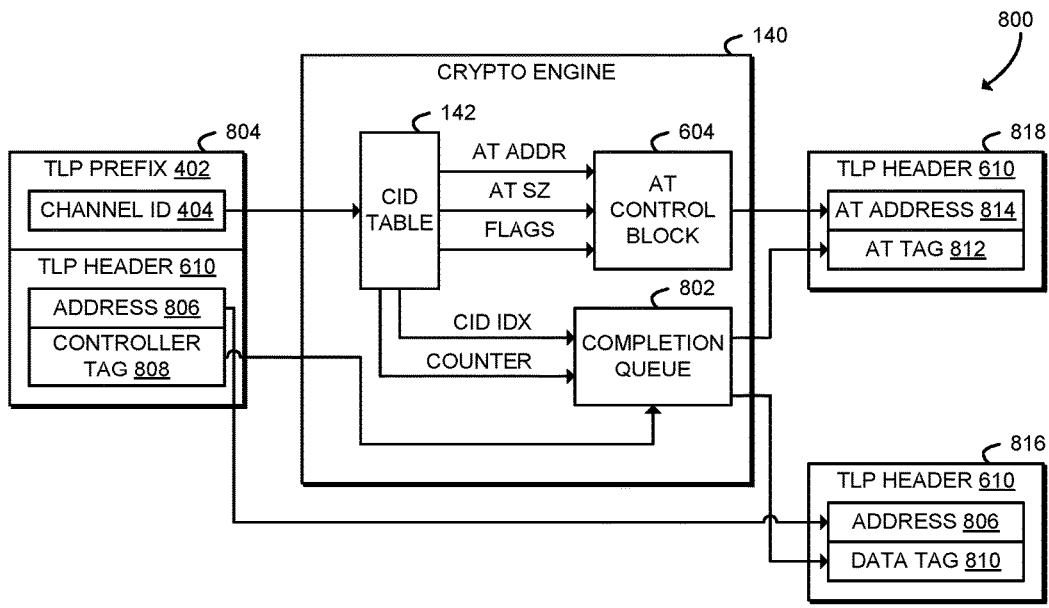
FIG. 8 is a simplified block diagram illustrating operation of the method of FIG. 7.

Referring now to FIG. 8, diagram 800 illustrates processing of a DMA read request transaction that may be performed by the method 700. As shown, the cryptographic engine 140 includes the CID table 142, the AT control block 604, and a completion queue 802. The cryptographic engine 140 intercepts a DMA read request transaction 804, which includes a transaction layer packet (TLP) header 610 and a TLP prefix 402. The TLP header 610 identifies a source address 806 in the memory for the DMA read request transaction and a controller tag 808. As illustrated in FIG. 4, the TLP prefix 402 includes a channel identifier (CID) 404.

The cryptographic engine 140 indexes the CID table 142 with the CID 404. The CID index and the counter value generated by the CID table 142, as well as the controller tag 808, are provided to the completion queue 802. The completion queue 802 generates an associated data tag 810 and AT tag 812. An AT address, AT size, and flags are provided to the AT control block 604, which generates an AT buffer address 814. The cryptographic engine 140 generates a payload DMA read completion transaction 816 that includes a TLP header 610 that includes the source address 806 of the DMA read request transaction 804 and the data tag 810. The cryptographic engine 140 also generates an ATS DMA read request transaction 818 that includes a TLP header 610 that includes the AT buffer address 814 and the AT tag 812.

Figure 9:
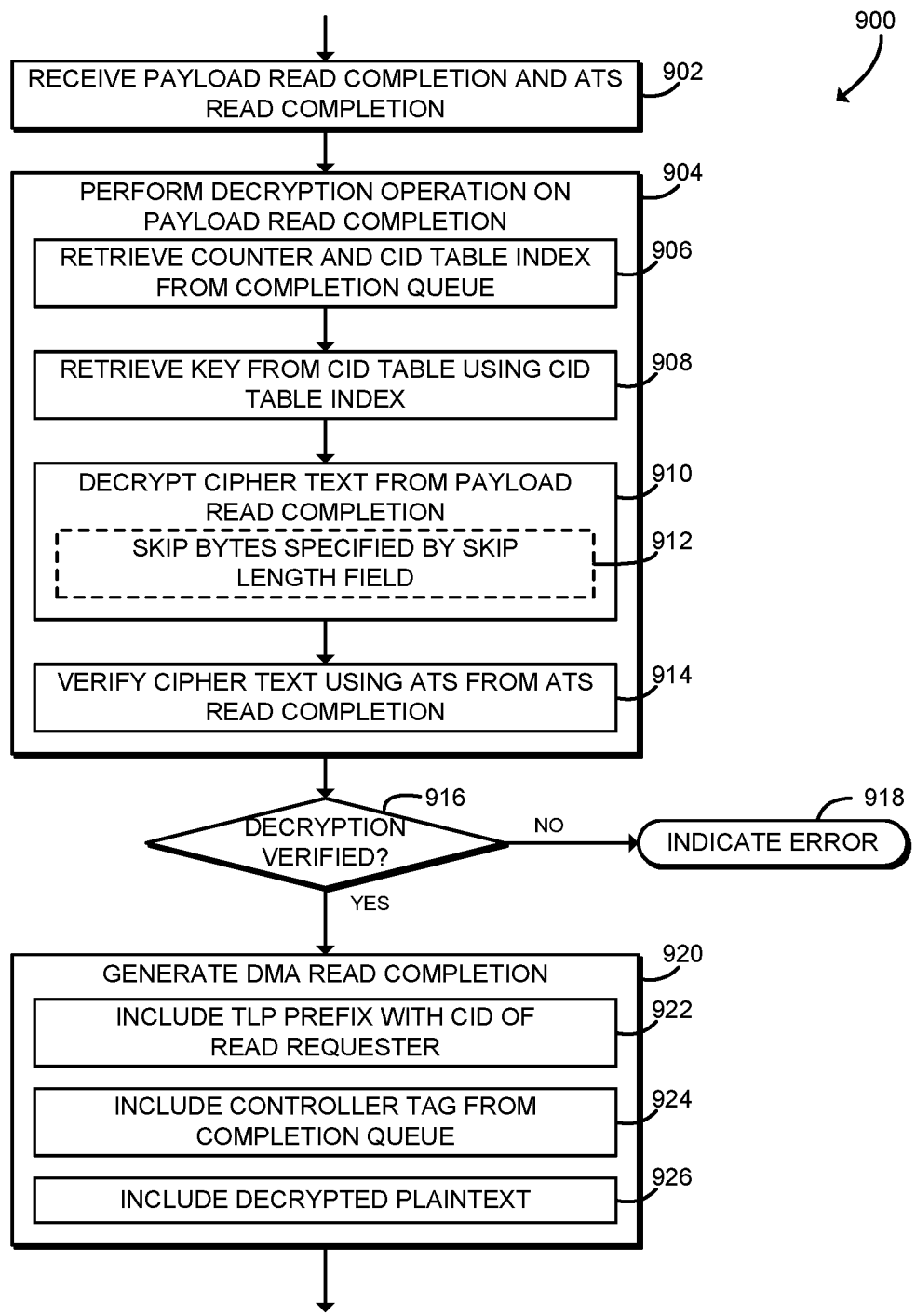
FIG. 9 is a simplified flow diagram of at least one embodiment of a method for processing a read completion transaction that may be executed by the cryptographic engine of the computing device of FIGS. 1-2.

Referring now to FIG. 9 in use, the computing device 100 may execute a method 900 for processing a DMA read completion transaction. The method 900 may be executed by the cryptographic engine 140 as part of the method 300, for example in connection with block 320 of FIG. 3. The method 900 begins with block 902, in which the cryptographic engine 140 receives a payload read completion transaction and a corresponding ATS read completion transaction. As described above, the read completion transactions may each be generated by the memory 132 in response to a corresponding read request transaction from the cryptographic engine 140. As described above, the DMA read completion transactions may be routed from the memory 132 to cryptographic engine 140 based on a data tag and/or AT tag included by the cryptographic engine 140 in the corresponding read request transaction.

In block 904, the cryptographic engine 140 performs a decryption operation on the payload read completion transaction. In particular, the cryptographic engine 140 may perform an authenticated decryption operation to decrypt and verify encrypted data stored in the memory 132. In block 906, the cryptographic engine 140 retrieves a counter value and CID table index from the completion queue of the cryptographic engine 140. As described above in connection with block 702 of FIG. 7, the cryptographic engine 140 stores those values in the completion queue in response to a prior read request transaction. In block 908, the cryptographic engine 140 retrieves the encryption key from the CID table 142 using the CID table 142 index. As described above, the CAM table 142 may also include additional information related to channel protection such as protection mode, direction bit, and skipping.

In block 910, the cryptographic engine 140 decrypts cipher text from the payload read completion transaction to generate plaintext I/O data. The cipher text may correspond to encrypted I/O data that was stored in the memory 132 by trusted software such as an application enclave, device driver enclave, or other trusted software entity or trusted execution environment. The cryptographic engine 140 may use any appropriate decryption algorithm. For example, in some embodiments the cryptographic engine 140 may perform AES-GCM decryption. The cryptographic engine 140 decrypts the cipher text using the encryption key retrieved from the CID table 142. In some embodiments, in block 912 the cryptographic engine 140 may skip a certain number of bytes specified by a skip length field of the matching CID table 142 entry. For example, the cryptographic engine 140 may pass through the skipped bytes without decryption.

In block 914, the cryptographic engine 140 verifies the cipher text using ATS data from the ATS read completion transaction. Thus, the cryptographic engine 140 provides authenticity and integrity assurance for the encrypted cipher text. The cipher text may be verified using the authentication tag structure any appropriate authenticated encryption algorithm, such as AES-GCM. In block 916, the cryptographic engine 140 determines whether the decryption operation was successfully verified. If not, the method 900 branches to block 918, in which the cryptographic engine 140 indicates a verification error. Referring back to block 916, if the decryption is successfully verified, the method 900 advances to block 920.

In block 920, the cryptographic engine 140 generates a DMA read completion transaction. The DMA read completion includes the plaintext I/O data and is directed at the I/O controller 144 that generated the original DMA read request transaction. In block 922, the cryptographic engine 140 includes a TLP prefix including the channel identifier (CID) of the associated I/O device 146. For example, the CID may be stored from the original DMA read request transaction. In block 924, the crypto engine includes the controller tag associated with the original DMA read request from the completion queue. Including the controller tag mimics a read completion from the memory 132 and causes the DMA read completion transaction to be routed to the correct I/O controller 144. In block 926, the cryptographic engine 140 includes the decrypted plaintext I/O data. After generating the read completion transaction, the method 900 is completed, and the I/O controller 144 may output the I/O data from the read completion transaction to the appropriate I/O device 146. Because the I/O data is transmitted in the clear from the cryptographic engine 140 to the I/O controller 144 and then on to the I/O device 146, the I/O device 146 does not need to perform any decryption operations. As described above in connection with FIG. 3, the cryptographic engine 140 may continue to monitor for DMA transactions.

Figure 10:
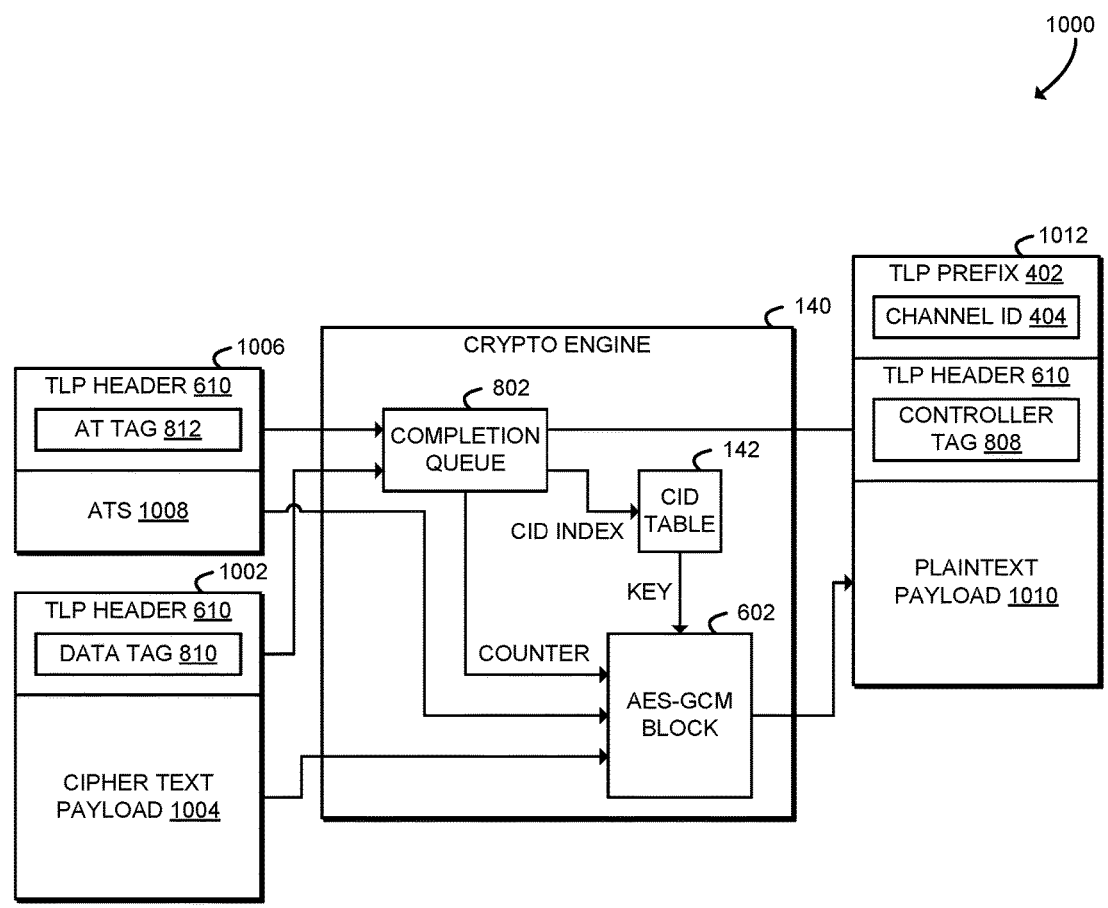
FIG. 10 is a simplified block diagram illustrating operation of the method of FIG. 9.

Referring now to FIG. 10, diagram 1000 illustrates processing of read completion transactions that may be performed by the method 900. As shown, the cryptographic engine 140 includes the CID table 142, the AES-GCM block 602, and the completion queue 802. The cryptographic engine 140 intercepts a payload read completion transaction 1002, which includes a cipher text payload 1004, and a TLP header 610. The TLP header 610 includes the data tag 810, which allows the cryptographic engine 140 to identify the payload read completion transaction 1002. The cryptographic engine 140 also intercepts an ATS read completion transaction 1006, which includes an ATS payload 1008, and a TLP header 610. The TLP header 610 includes the AT tag 812, which allows the cryptographic engine 140 to identify the ATS read completion transaction 1006.

The cryptographic engine 140 uses the data tag 810 and/or the AT tag 812 to look up a counter value and a CID table 142 index from the completion queue 802. The cryptographic engine 140 indexes the CID table 142 with the CID table 142 index to retrieve the encryption key. The encryption key, counter value, cipher text payload 1004, and ATS payload 1008 are provided to the AES-GCM block 602. The AES-GCM block 602 verifies the cipher text payload 1004 using the ATS payload 1008 and generates a decrypted plaintext payload 1010. The cryptographic engine 140 generates a read completion transaction 1012 that includes the plaintext payload 1010, a TLP header 610 that includes the controller tag 808, and a TLP prefix 402 that includes the CID 404 of the associated DMA channel.

It should be appreciated that, in some embodiments, the methods 300, 500, 700, and/or 900 may be embodied as various instructions stored on a computer-readable media, which may be executed by the cryptographic engine 140, the processor 120, and/or other components of the computing device 100 to cause the computing device 100 to perform the corresponding method 300, 500, 700, and/or 900. The computer-readable media may be embodied as any type of media capable of being read by the computing device 100 including, but not limited to, the memory 132, the data storage device 134, memory of the cryptographic engine 140, firmware of the cryptographic engine 140, and/or other media.

EXAMPLES

Illustrative examples of the technologies disclosed herein are provided below. An embodiment of the technologies may include any one or more, and any combination of, the examples described below.

Example 1 includes a computing device for secure I/O, the computing device comprising: an I/O controller to generate a direct memory access (DMA) transaction, wherein the DMA transaction includes a channel identifier that is indicative of the I/O controller and that is indicative of an I/O device coupled to the I/O controller; an interception module to (i) intercept the DMA transaction from the I/O controller and (ii) determine whether to protect the DMA transaction as a function of the channel identifier; and a protection module to perform a cryptographic operation using an encryption key associated with the channel identifier in response to a determination to protect the DMA transaction.

Example 2 includes the subject matter of Example 1, and further comprising a cryptographic engine comprising a channel identifier table and a hardware cryptography block, wherein: to intercept the DMA transaction comprises to intercept the DMA transaction by the cryptographic engine; to determine whether to protect the DMA transaction comprises to: (i) determine, by the cryptographic engine, whether the channel identifier of the DMA transaction matches an entry of a channel identifier table of the cryptographic engine, and (ii) retrieve, by the cryptographic engine, the encryption key from the entry of the channel identifier table in response to a determination that the channel identifier of the DMA transaction matches the entry; and to perform the cryptographic operation comprises to perform, by the cryptographic engine, a cryptographic operation with a hardware cryptography block of the cryptographic engine using the encryption key.

Example 3 includes the subject matter of any of Examples 1 and 2, and wherein the channel identifier table comprises a content-addressable memory of the cryptographic engine.

Example 4 includes the subject matter of any of Examples 1-3, and wherein the DMA transaction comprises a transaction layer packet (TLP) prefix, wherein the TLP prefix includes the channel identifier.

Example 5 includes the subject matter of any of Examples 1-4, and wherein the interception module is further to pass the DMA transaction to a memory of the computing device in response to a determination not to protect the DMA transaction.

Example 6 includes the subject matter of any of Examples 1-5, and wherein: the DMA transaction comprises a DMA write transaction that further includes plaintext I/O data generated by the I/O device; and to perform the cryptographic operation comprises to generate encrypted cipher text as a function of the plaintext I/O data and the encryption key.

Example 7 includes the subject matter of any of Examples 1-6, and wherein: the protection module is further to generate a second DMA write transaction in response to performance of the cryptographic operation, wherein the second DMA write transaction includes the cipher text and a target address in a memory of the computing device; wherein the DMA write transaction further includes the target address in the memory.

Example 8 includes the subject matter of any of Examples 1-7, and further comprising a trusted application module to decrypt, by trusted software of the computing device, the cipher text with the encryption key in response to generation of the second DMA write transaction.

Example 9 includes the subject matter of any of Examples 1-8, and further comprising a processor that includes secure enclave support, wherein the trusted application module is further to establish an application secure enclave, wherein the application secure enclave comprises the trusted software.

Example 10 includes the subject matter of any of Examples 1-9, and wherein to perform the cryptographic operation further comprises to generate an authentication tag structure as a function of the plaintext I/O data and the encryption key.

Example 11 includes the subject matter of any of Examples 1-10, and wherein the protection module is further to generate a second DMA write transaction in response to performance of the cryptographic operation, wherein the second DMA write transaction includes the authentication tag structure and an address of an authentication tag buffer in a memory of the computing device.

Example 12 includes the subject matter of any of Examples 1-11, and wherein the DMA transaction comprises a DMA read request transaction that includes a controller tag associated with the I/O controller and a target address in the memory.

Example 13 includes the subject matter of any of Examples 1-12, and wherein the protection module is further to generate a second DMA read request transaction in response to the determination to protect the DMA transaction, wherein the second DMA read request transaction includes a data tag and the target address.

Example 14 includes the subject matter of any of Examples 1-13, and wherein: the interception module is further to intercept a DMA read completion transaction in response to generation of the second DMA read request transaction, wherein the DMA read completion transaction includes the data tag and encrypted cipher text; and to perform the cryptographic operation comprises to generate decrypted plaintext I/O data as a function of the cipher text and the encryption key.

Example 15 includes the subject matter of any of Examples 1-14, and wherein the protection module is further to generate a second DMA read completion transaction in response to performance of the cryptographic operation, wherein the second DMA read completion transaction includes the plaintext I/O data, the controller tag, and the channel identifier.

Example 16 includes the subject matter of any of Examples 1-15, and wherein the protection module is further to generate a second DMA read request transaction in response to the determination to protect the DMA transaction, wherein the second DMA read request transaction includes an authentication tag (AT) tag and an address of an authentication tag buffer in the memory.

Example 17 includes the subject matter of any of Examples 1-16, and wherein: the interception module is further to intercept a DMA read completion transaction in response to generation of the second DMA read request transaction, wherein the DMA read completion transaction includes the AT tag and an authentication tag structure; and to perform the cryptographic operation comprises to authenticate encrypted cipher text as a function of the authentication tag structure and the encryption key.

Example 18 includes a method for secure I/O, the method comprising: intercepting, by a computing device, a direct memory access (DMA) transaction from an I/O controller of the computing device, wherein the DMA transaction includes a channel identifier that is indicative of the I/O controller and that is indicative of an I/O device coupled to the I/O controller; determining, by the computing device, whether to protect the DMA transaction as a function of the channel identifier; and performing, by the computing device, a cryptographic operation using an encryption key associated with the channel identifier in response to determining to protect the DMA transaction.

Example 19 includes the subject matter of Example 18, and wherein: intercepting the DMA transaction comprises intercepting the DMA transaction by a cryptographic engine of the computing device; determining whether to protect the DMA transaction comprises: (i) determining, by the cryptographic engine, whether the channel identifier of the DMA transaction matches an entry of a channel identifier table of the cryptographic engine, and (ii) retrieving, by the cryptographic engine, the encryption key from the entry of the channel identifier table in response to determining that the channel identifier of the DMA transaction matches the entry; and performing the cryptographic operation comprises performing, by the cryptographic engine, a cryptographic operation with a hardware cryptography block of the cryptographic engine using the encryption key.

Example 20 includes the subject matter of any of Examples 18 and 19, and wherein determining whether the channel identifier of the DMA transaction matches an entry of a channel identifier table comprises searching a content-addressable memory of the cryptographic engine.

Example 21 includes the subject matter of any of Examples 18-20, and wherein intercepting the DMA transaction comprises intercepting a DMA transaction that includes a transaction layer packet (TLP) prefix, wherein the TLP prefix includes the channel identifier.

Example 22 includes the subject matter of any of Examples 18-21, and further comprising passing the DMA transaction to a memory of the computing device in response to determining not to protect the DMA transaction.

Example 23 includes the subject matter of any of Examples 18-22, and wherein: intercepting the DMA transaction comprises intercepting a DMA write transaction, wherein the DMA transaction further includes plaintext I/O data generated by the I/O device; and performing the cryptographic operation comprises generating encrypted cipher text as a function of the plaintext I/O data and the encryption key.

Example 24 includes the subject matter of any of Examples 18-23, and further comprising: generating, by the computing device, a second DMA write transaction in response to performing the cryptographic operation, wherein the second DMA write transaction includes the cipher text and a target address in a memory of the computing device; wherein the DMA write transaction further includes the target address in the memory.

Example 25 includes the subject matter of any of Examples 18-24, and further comprising decrypting, by trusted software of the computing device, the cipher text with the encryption key in response to generating the second DMA write transaction.

Example 26 includes the subject matter of any of Examples 18-25, and further comprising establishing, by a processor of the computing device that includes secure enclave support, an application secure enclave, wherein the application secure enclave comprises the trusted software.

Example 27 includes the subject matter of any of Examples 18-26, and wherein performing the cryptographic operation further comprises generating an authentication tag structure as a function of the plaintext I/O data and the encryption key.

Example 28 includes the subject matter of any of Examples 18-27, and further comprising generating, by the computing device, a second DMA write transaction in response to performing the cryptographic operation, wherein the second DMA write transaction includes the authentication tag structure and an address of an authentication tag buffer in a memory of the computing device.

Example 29 includes the subject matter of any of Examples 18-28, and wherein intercepting the DMA transaction comprises intercepting a DMA read request transaction, wherein the DMA transaction includes a controller tag associated with the I/O controller and a target address in a memory of the computing device.

Example 30 includes the subject matter of any of Examples 18-29, and further comprising generating, by the computing device, a second DMA read request transaction in response to determining to protect the DMA transaction, wherein the second DMA read request transaction includes a data tag and the target address.

Example 31 includes the subject matter of any of Examples 18-30, and further comprising: intercepting, by the computing device, a DMA read completion transaction in response to generating the second DMA read request transaction, wherein the DMA read completion transaction includes the data tag and encrypted cipher text; wherein performing the cryptographic operation comprises generating decrypted plaintext I/O data as a function of the cipher text and the encryption key.

Example 32 includes the subject matter of any of Examples 18-31, and further comprising generating, by the computing device, a second DMA read completion transaction in response to performing the cryptographic operation, wherein the second DMA read completion transaction includes the plaintext I/O data, the controller tag, and the channel identifier.

Example 33 includes the subject matter of any of Examples 18-32, and further comprising generating, by the computing device, a second DMA read request transaction in response to determining to protect the DMA transaction, wherein the second DMA read request transaction includes an authentication tag (AT) tag and an address of an authentication tag buffer in the memory.

Example 34 includes the subject matter of any of Examples 18-33, and further comprising: intercepting, by the computing device, a DMA read completion transaction in response to generating the second DMA read request transaction, wherein the DMA read completion transaction includes the AT tag and an authentication tag structure; wherein performing the cryptographic operation comprises authenticating encrypted cipher text as a function of the authentication tag structure and the encryption key.

Example 35 includes a computing device comprising: a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for secure I/O, the computing device comprising: means for intercepting a direct memory access (DMA) transaction from an I/O controller of the computing device, wherein the DMA transaction includes a channel identifier that is indicative of the I/O controller and that is indicative of an I/O device coupled to the I/O controller; means for determining whether to protect the DMA transaction as a function of the channel identifier; and means for performing a cryptographic operation using an encryption key associated with the channel identifier in response to determining to protect the DMA transaction.

Example 39 includes the subject matter of Example 38, and wherein: the means for intercepting the DMA transaction comprises means for intercepting the DMA transaction by a cryptographic engine of the computing device; the means for determining whether to protect the DMA transaction comprises: (i) means for determining, by the cryptographic engine, whether the channel identifier of the DMA transaction matches an entry of a channel identifier table of the cryptographic engine, and (ii) means for retrieving, by the cryptographic engine, the encryption key from the entry of the channel identifier table in response to determining that the channel identifier of the DMA transaction matches the entry; and the means for performing the cryptographic operation comprises means for performing, by the cryptographic engine, a cryptographic operation with a hardware cryptography block of the cryptographic engine using the encryption key.

Example 40 includes the subject matter of any of Examples 38 and 39, and wherein the means for determining whether the channel identifier of the DMA transaction matches an entry of a channel identifier table comprises means for searching a content-addressable memory of the cryptographic engine.

Example 41 includes the subject matter of any of Examples 38-40, and wherein the means for intercepting the DMA transaction comprises means for intercepting a DMA transaction that includes a transaction layer packet (TLP) prefix, wherein the TLP prefix includes the channel identifier.

Example 42 includes the subject matter of any of Examples 38-41, and further comprising means for passing the DMA transaction to a memory of the computing device in response to determining not to protect the DMA transaction.

Example 43 includes the subject matter of any of Examples 38-42, and wherein: the means for intercepting the DMA transaction comprises means for intercepting a DMA write transaction, wherein the DMA transaction further includes plaintext I/O data generated by the I/O device; and the means for performing the cryptographic operation comprises means for generating encrypted cipher text as a function of the plaintext I/O data and the encryption key.

Example 44 includes the subject matter of any of Examples 38-43, and further comprising: means for generating a second DMA write transaction in response to performing the cryptographic operation, wherein the second DMA write transaction includes the cipher text and a target address in a memory of the computing device; wherein the DMA write transaction further includes the target address in the memory.

Example 45 includes the subject matter of any of Examples 38-44, and further comprising means for decrypting, by trusted software of the computing device, the cipher text with the encryption key in response to generating the second DMA write transaction.

Example 46 includes the subject matter of any of Examples 38-45, and further comprising means for establishing, by a processor of the computing device that includes secure enclave support, an application secure enclave, wherein the application secure enclave comprises the trusted software.

Example 47 includes the subject matter of any of Examples 38-46, and wherein the means for performing the cryptographic operation further comprises means for generating an authentication tag structure as a function of the plaintext I/O data and the encryption key.

Example 48 includes the subject matter of any of Examples 38-47, and further comprising means for generating a second DMA write transaction in response to performing the cryptographic operation, wherein the second DMA write transaction includes the authentication tag structure and an address of an authentication tag buffer in a memory of the computing device.

Example 49 includes the subject matter of any of Examples 38-48, and wherein the means for intercepting the DMA transaction comprises means for intercepting a DMA read request transaction, wherein the DMA transaction includes a controller tag associated with the I/O controller and a target address in a memory of the computing device.

Example 50 includes the subject matter of any of Examples 38-49, and further comprising means for generating a second DMA read request transaction in response to determining to protect the DMA transaction, wherein the second DMA read request transaction includes a data tag and the target address.

Example 51 includes the subject matter of any of Examples 38-50, and further comprising: means for intercepting a DMA read completion transaction in response to generating the second DMA read request transaction, wherein the DMA read completion transaction includes the data tag and encrypted cipher text; wherein the means for performing the cryptographic operation comprises means for generating decrypted plaintext I/O data as a function of the cipher text and the encryption key.

Example 52 includes the subject matter of any of Examples 38-51, and further comprising means for generating a second DMA read completion transaction in response to performing the cryptographic operation, wherein the second DMA read completion transaction includes the plaintext I/O data, the controller tag, and the channel identifier.

Example 53 includes the subject matter of any of Examples 38-52, and further comprising means for generating a second DMA read request transaction in response to determining to protect the DMA transaction, wherein the second DMA read request transaction includes an authentication tag (AT) tag and an address of an authentication tag buffer in the memory.

Example 54 includes the subject matter of any of Examples 38-53, and further comprising: means for intercepting a DMA read completion transaction in response to generating the second DMA read request transaction, wherein the DMA read completion transaction includes the AT tag and an authentication tag structure; wherein the means for performing the cryptographic operation comprises means for authenticating encrypted cipher text as a function of the authentication tag structure and the encryption key.

The invention claimed is:

1. A computing device for secure I/O, the computing device comprising:
an I/O controller to generate a direct memory access (DMA) transaction, wherein the DMA transaction includes a channel identifier that is indicative of the I/O controller and that is indicative of an I/O device coupled to the I/O controller; and
a cryptographic engine comprising a channel identifier table and a hardware cryptography block, wherein the cryptographic engine is to (i) intercept the DMA transaction from the I/O controller, (ii) determine whether to protect the DMA transaction as a function of the channel identifier, wherein to determine whether to protect the DMA transaction as a function of the channel identifier comprises to compare the channel identifier included in the DMA transaction to the channel identifier table of the cryptographic engine, and (iii) perform a cryptographic operation with the hardware cryptography block of the cryptographic engine using an encryption key associated with the channel identifier in response to a determination to protect the DMA transaction;
wherein to determine whether to protect the DMA transaction as a function of the channel identifier comprises to: (i) determine, by the cryptographic engine, whether the channel identifier of the DMA transaction matches an entry of the channel identifier table of the cryptographic engine, wherein the channel identifier table comprises a content-addressable memory of the cryptographic engine, and (ii) retrieve, by the cryptographic engine, the encryption key from the entry of the channel identifier table in response to a determination that the channel identifier of the DMA transaction matches the entry.

2. The computing device of claim 1, wherein the DMA transaction comprises a transaction layer packet (TLP) prefix, wherein the TLP prefix includes the channel identifier.

3. The computing device of claim 1, wherein:
the DMA transaction comprises a DMA write transaction that further includes plaintext I/O data generated by the I/O device; and
to perform the cryptographic operation comprises to generate encrypted cipher text as a function of the plaintext I/O data and the encryption key.

4. The computing device of claim 3, wherein:
the cryptographic engine is further to generate a second DMA write transaction in response to performance of the cryptographic operation, wherein the second DMA write transaction includes the cipher text and a target address in a memory of the computing device;
wherein the DMA write transaction further includes the target address in the memory.

5. The computing device of claim 4, further comprising a trusted application module to decrypt, by trusted software of the computing device, the cipher text with the encryption key in response to generation of the second DMA write transaction.

6. The computing device of claim 3, wherein to perform the cryptographic operation further comprises to generate an authentication tag structure as a function of the plaintext I/O data and the encryption key.

7. The computing device of claim 1, wherein the DMA transaction comprises a DMA read request transaction that includes a controller tag associated with the I/O controller and a target address in the memory.

8. The computing device of claim 7, wherein the cryptographic engine is further to generate a second DMA read request transaction in response to the determination to protect the DMA transaction, wherein the second DMA read request transaction includes a data tag and the target address.

9. The computing device of claim 8, wherein:
the cryptographic engine is further to intercept a DMA read completion transaction in response to generation of the second DMA read request transaction, wherein the DMA read completion transaction includes the data tag and encrypted cipher text; and
to perform the cryptographic operation comprises to generate decrypted plaintext I/O data as a function of the cipher text and the encryption key.

10. The computing device of claim 7, wherein the cryptographic engine is further to generate a second DMA read request transaction in response to the determination to protect the DMA transaction, wherein the second DMA read request transaction includes an authentication tag (AT) and an address of an authentication tag buffer in the memory.

11. A method for secure I/O, the method comprising:
intercepting, by a cryptographic engine of a computing device, a direct memory access (DMA) transaction from an I/O controller of the computing device, wherein the DMA transaction includes a channel identifier that is indicative of the I/O controller and that is indicative of an I/O device coupled to the I/O controller;
determining, by the cryptographic engine of the computing device, whether to protect the DMA transaction as a function of the channel identifier, wherein determining whether to protect the DMA transaction as a function of the channel identifier comprises comparing the channel identifier included in the DMA transaction to a channel identifier table of the cryptographic engine, and wherein determining whether to protect the DMA transaction further comprises: (i) determining, by the cryptographic engine, whether the channel identifier of the DMA transaction matches an entry of the channel identifier table of the cryptographic engine, wherein the channel identifier table comprises a content-addressable memory of the cryptographic engine, and (ii) retrieving, by the cryptographic engine, an encryption key from the entry of the channel identifier table in response to determining that the channel identifier of the DMA transaction matches the entry; and performing, by the cryptographic engine of the computing device, a cryptographic operation with a hardware cryptography block of the cryptographic engine using the encryption key associated with the channel identifier in response to determining to protect the DMA transaction.

12. The method of claim 11, wherein intercepting the DMA transaction comprises intercepting a DMA transaction that includes a transaction layer packet (TLP) prefix, wherein the TLP prefix includes the channel identifier.

13. The method of claim 11, wherein:
intercepting the DMA transaction comprises intercepting a DMA write transaction, wherein the DMA transaction further includes plaintext I/O data generated by the I/O device; and
performing the cryptographic operation comprises generating encrypted cipher text as a function of the plaintext I/O data and the encryption key.

14. The method of claim 11, wherein intercepting the DMA transaction comprises intercepting a DMA read request transaction, wherein the DMA transaction includes a controller tag associated with the I/O controller and a target address in a memory of the computing device.

15. One or more non-transitory, machine readable storage media comprising a plurality of instructions that in response to being executed cause a computing device to:
intercept, by a cryptographic engine of the computing device, a direct memory access (DMA) transaction from an I/O controller of the computing device, wherein the DMA transaction includes a channel identifier that is indicative of the I/O controller and that is indicative of an I/O device coupled to the I/O controller;
determine, by the cryptographic engine, whether to protect the DMA transaction as a function of the channel identifier, wherein to determine whether to protect the DMA transaction as a function of the channel identifier comprises to compare the channel identifier included in the DMA transaction to a channel identifier table of the cryptographic engine, and wherein to determine whether to protect the DMA transaction further comprises to: (i) determine, by the cryptographic engine, whether the channel identifier of the DMA transaction matches an entry of the channel identifier table of the cryptographic engine, wherein the channel identifier table comprises a content-addressable memory of the cryptographic engine, and (ii) retrieve, by the cryptographic engine, an encryption key from the entry of the channel identifier table in response to determining that the channel identifier of the DMA transaction matches the entry; and perform, by the cryptographic engine, a cryptographic operation with a hardware cryptography block of the cryptographic engine using the encryption key associated with the channel identifier in response to determining to protect the DMA transaction.

16. The one or more non-transitory, machine readable storage media of claim 15, wherein to intercept the DMA transaction comprises to intercept a DMA transaction that includes a transaction layer packet (TLP) prefix, wherein the TLP prefix includes the channel identifier.

17. The one or more non-transitory, machine readable storage media of claim 15, wherein:
to intercept the DMA transaction comprises to intercept a DMA write transaction, wherein the DMA transaction further includes plaintext I/O data generated by the I/O device; and
to perform the cryptographic operation comprises to generate encrypted cipher text as a function of the plaintext I/O data and the encryption key.

18. The one or more non-transitory, machine readable storage media of claim 17, further comprising a plurality of instructions that in response to being executed cause the computing device to:
generate a second DMA write transaction in response to performing the cryptographic operation, wherein the second DMA write transaction includes the cipher text and a target address in a memory of the computing device;
wherein the DMA write transaction further includes the target address in the memory.

19. The one or more non-transitory, machine readable storage media of claim 15, wherein to intercept the DMA transaction comprises to intercept a DMA read request transaction, wherein the DMA transaction includes a controller tag associated with the I/O controller and a target address in a memory of the computing device.

20. The one or more non-transitory, machine readable storage media of claim 19, further comprising a plurality of instructions that in response to being executed cause the computing device to generate a second DMA read request transaction in response to determining to protect the DMA transaction, wherein the second DMA read request transaction includes a data tag and the target address.

* * * * *